Jan. 21, 1964
J. BOCHAN
3,118,468
RESILIENT MATERIAL CHECK VALVE
Filed April 20, 1961
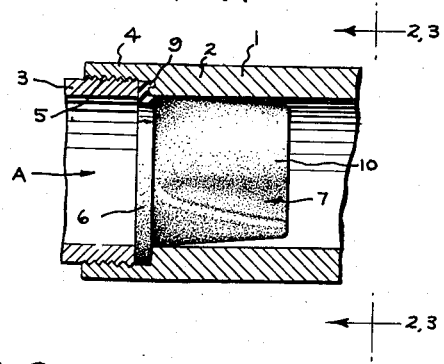
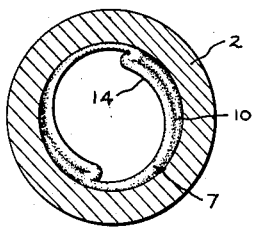 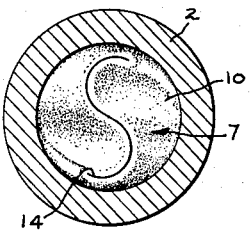
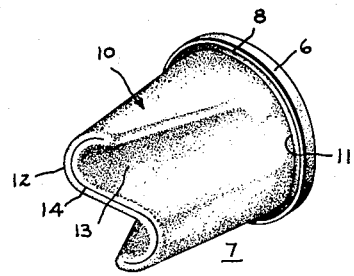
INVENTOR.
JOHN BOCHAN
BY *Derek P Lawrence*
HIS ATTORNEY 3,118,468
RESILIENT MATERIAL CHECK VALVE
John Bochan, Louisville, Ky., assignor to General Electric
Company, a corporation of New York
Filed Apr. 20, 1961, Ser. No. 104,433
4 Claims. (Cl. 137—525.1)

This invention relates to automatic check valves, and more particularly to such valves of the type embodying a single member formed of a rubber-like material through which fluid flows in one direction by deforming the member, and which is designed to prevent the flow of fluid in the other direction by closing tightly under the influence of back pressure.

Valves of the general type mentioned above are well known and extensively used. Generally, these valves have their outlet opening formed as a straight slit, the valve being deformable under internal pressure to open the slit into a generally circular opening. This means that the slit is substantially longer in its closed position than in its open position with the result that, for full flow to be provided, the conduit within which it is positioned must be specially formed so as to accommodate the valve in its closed position; in other words, assuming the conventional round cross-section for the conduit, it must be larger in dimension at that point than would be necessary for flow purposes. Modifications have been made to overcome this difficulty. For instance, valves have been formed with two slits at right angles to each other so that deformation would occur between each two adjacent legs of the resulting cross. This has had the disadvantage that substantial stress is placed on the material of the valve causing a rapid failure thereof. This is particularly objectionable when the valve is incorporated in apparatus where it is not readily accessible and where the apparatus is expected to function without fault for a substantial period of time.

Accordingly, an object of my invention is to provide a unitary check valve formed of a rubber-like material wherein the maximum dimensions of the valve outlet member remain substantially unchanged whether the valve is open or closed, and wherein at the same time excessive stressing of the material of the valve is avoided.

A further more specific object of my invention is to achieve the foregoing goals by forming the outlet opening of the valve in the shape of an S.

In carrying out my invention, I provide a unitary check valve which is formed of a rubber-like material. The valve has an annular base portion intended to be secured rigidly at the inner surface of a conduit, and a hollow portion with an inlet end connected to the base portion and an outlet end spaced from the base portion. The hollow portion is, at least partly, tapered inwardly from the inlet toward the outlet, with the outlet being formed as an S with a continuous substantially matching S-shaped slit formed therein. In response to pressure within the hollow portion, it is deformable to cause the sides of the slit to spread apart, and conversely, in response to back pressure outside the hollow portion, the sides of the slit are pressed against each other to cause the slit to be tightly closed.

In its preferred embodiment, the S-shaped slit of my valve structure has a perimeter which is substantially equal in length to the perimeter of the inlet end of the hollow portion, the inlet end having substantially the same contour as the inner surface of the conduit within which it is positioned. Thus, the valve is deformable to an extreme, or maximum, position where the hollow portion becomes substantially cylindrical within the conduit.

The subject matter which I regard as my invention is particularly pointed out and distinctly claimed in the concluding portions of this specification. My invention, however, together with further objects and advantages thereof, may best be understood by reference to the following description taken in conjunction with the accompanying drawing.

In the drawing, FIGURE 1 is a side elevational view, partly in cross-section, of my invention wherein my valve is incorporated in a conduit in cooperative relationship therewith;

FIGURE 2 is a view along line 2, 3—2, 3 in FIGURE 1 wherein the valve has been forced by fluid pressure to its open position;

FIGURE 3 is a view along line 2, 3—2, 3 in FIGURE 1 wherein the valve is in its normal closed position; and FIGURE 4 is a view in perspective of the unitary valve member.

Referring now to the drawing, and more particularly initially to FIGURE 1, there is shown a conduit 1 which includes two separate conduit sections 2 and 3, conventionally formed with a uniform cross-section. Conduit section 2 includes an internally threaded section 4, and conduit 3 includes an externally threaded section 5. Sections 4 and 5 may be threaded together into mating relationship to form the single continuous conduit 1. Secured within the junction of the two conduits 2 and 3 is the annular base portion 6 of a unitary check valve 7, best seen in FIGURE 4. The valve 7 is formed of any suitable rubber-like material, that is, a material either of natural or synthetic origin which has the properties of rubber in that it combines a high degree of deformability with substantial resilience and elasticity.

The annular base 6 of valve 7 may be provided with a bead 8 extending therearound, the bead 8 fitting into a corresponding annular groove 9 formed in the end of conduit 2. Thus, the base portion 6 of the valve is not only held in position by the threaded engagement of the two conduit portions 4 and 5, but is also rigidly secured against movement by the engagement of the bead 8 within the recess 9.

Valve 7 further includes a hollow portion 10 having an inlet end 11 joined to base 6 and an outlet end 12 which is spaced downstream in conduit 1 from the base 6. At its inlet end 11 the portion 10 has its outer diameter substantially equal to the inner diameter of conduit 2. In order to provide the S-shaped contour shown at end 12, the hollow portion 10 includes parts 13 which taper inwardly to a substantial extent from end 11 toward end 12 so as to provide the desired S-shaped contour of the end 12. In the preferred embodiment, in addition, the valve may be formed as a molded member with a symmetrical S shape at end 12; in that case, the entire portion 10 is provided with at least a draft angle taper as shown. However, the essential feature is that the parts 13 of hollow portion 10 be tapered as stated above.

A continuous S-shaped slit 14 is formed in the S-shaped outlet end 12 of valve 7, matching the shape of the end 12 as shown. Preferably the perimeter of slit 14, that is, twice its length, is approximately equal to the perimeter of the inlet end 11 of portion 10. This means that, as a result of fluid flow in the direction shown by arrow A in FIGURE 1, the slit may be forced by the fluid pressure from its normal position (as shown in FIGURE 3) toward the position shown in FIGURE 2. It will further be understood in this connection that as the slit is opened wider and wider the part 10 comes closer and closer to approximating a cylinder, and in the fully open position of the slit 14, as shown in FIGURE 2, the outlet end 12 is substantially fully expanded against the inner surface of conduit 2.

This highly desirable result of having the valve move from its closed position to an open position without any substantial change in the maximum dimension of the valve is achieved without any substantial stresses being placed on the material of the valve. This results because each side of the slit 14, as a result of its S shape, includes a concave surface and a convex surface. The two surfaces blend smoothly into each other so that as the slit opens and changes shape the convex portion of the slit may take up an increasing proportion of the length from the concave portion without any substantial compression or shear being exerted at any point. This elimination of any substantial stress on the valve is a highly desirable feature in that it is stress which weakens the material of the valve and shortens its life. The operation of the valve without such stress means that its life is substantially lengthened. Thus, not only may the valve be fitted within a conduit without special changes being made to the conduit to accommodate the valve in its closed position, but also it incorporates the same lack of undesirable stresses that is present in conventional valves of the type which do substantially change their maximum dimensions. It will further be observed that any back pressure in conduit section 2 outside valve 7 will cause the sides of slit 14 to be firmly pressed against each other to close the slit, as is desired in such a case.

While in accordance with the patent statutes I have described what at present is considered to be the preferred embodiment of my invention, it will be obvious to those skilled in the art that various changes and modifications may be made therein without departing from the invention, and it is therefore aimed in the appended claims to cover all such equivalent variations as fall within the true spirit and scope of my invention.

What I claim as new and desire to secure by Letters Patent of the United States is:

1. A unitary check valve formed of a rubber-like material, said valve having an annular base portion and a hollow portion, said hollow portion having an inlet end connected to said base portion and an outlet end spaced from said base portion on one side thereof, said hollow portion having at least parts thereof tapering inwardly from said inlet end to said outlet end, said outlet end being formed as a single S and having a single continuous slit formed therein substantially S-shaped transversely of said outlet end, said hollow portion being deformable in response to pressure therewithin to cause the sides of said slit to spread apart and being responsive to pressure outside it to close said slit tightly.

2. The article defined in claim 1 wherein said slit has a symmetrical S shape.

3. The article defined in claim 1 wherein said slit has a perimeter substantially equal in length to the inner perimeter of said inlet end, whereby deformation of said hollow portion in response to pressure therewithin may continue until said hollow portion is substantially cylindrical.

4. In combination: a conduit having a substantially uniform cross-section along at least a portion of its length and a unitary check valve formed of a rubber-like material, said valve having an annular base portion within said conduit portion, said valve further having a hollow portion with an inlet end connected to said base portion and an outlet end spaced from said base portion on one side thereof, said inlet end having its outer surface substantially in mating relation with the inner surface of said conduit portion, said hollow portion having at least parts thereof tapering inwardly from said inlet end to said outlet end, said outlet end being formed as a single S and having a single continuous substantially matching S-shaped slit formed therein, said slit having a perimeter substantially equal in length to the inner perimeter of said inlet end whereby deformation of said hollow portion in response to pressure therewithin may continue until said hollow portion is substantially cylindrical with its outlet end also in substantially mating relation within said conduit portion.

References Cited in the file of this patent

UNITED STATES PATENTS

| | | |
|---|---|---|
| 564,502 | Brookes | July 21, 1896 |
| 590,474 | Brookes | Sept. 21, 1897 |
| 2,662,724 | Kravagna | Dec. 15, 1953 |
| 2,674,318 | Sutliff | Apr. 6, 1954 |
| 2,682,057 | Lord | June 29, 1954 |
| 2,922,437 | Rippingille | June 26, 1960 |
| 3,047,013 | Baumbach | July 31, 1962 |

FOREIGN PATENTS

| | | |
|---|---|---|
| 268,451 | Great Britain | Apr. 5, 1927 |